(12) United States Patent
Rodriguez

(10) Patent No.: US 6,991,221 B1
(45) Date of Patent: Jan. 31, 2006

(54) AUTOMATIC JACKING SYSTEM FOR AN AUTOMOTIVE VEHICLE

(76) Inventor: Daniel G. Rodriguez, 4945 Leeland St., Houston, TX (US) 77023

( * ) Notice: Subject to any disclaimer, the term of this patent is extended or adjusted under 35 U.S.C. 154(b) by 0 days.

(21) Appl. No.: 10/908,039

(22) Filed: Apr. 26, 2005

(51) Int. Cl.
*B60S 9/02* (2006.01)
(52) U.S. Cl. .................... 254/423; 254/418; 280/766.1
(58) Field of Classification Search ................ 254/423, 254/418, 424–425, 89 H, 93 R; 280/766.1
See application file for complete search history.

(56) References Cited

U.S. PATENT DOCUMENTS

| | | | |
|---|---|---|---|
| 4,993,688 | A | 2/1991 | Mueller et al. |
| 5,219,429 | A | 6/1993 | Shelton |
| 5,224,688 | A | 7/1993 | Torres et al. |
| 5,377,957 | A | 1/1995 | Mosley |
| 5,465,940 | A | 11/1995 | Guzman et al. |
| 5,722,641 | A | 3/1998 | Martin et al. |
| 5,931,500 | A | 8/1999 | Dagnese |
| 6,224,040 | B1 | 5/2001 | Mejias et al. |
| 6,527,254 | B1 * | 3/2003 | Prevete ........................ 254/423 |
| 6,910,680 | B1 * | 6/2005 | Geller ......................... 254/423 |
| 6,913,248 | B1 * | 7/2005 | Schmitz ...................... 254/423 |
| 2005/0127343 | A1 * | 6/2005 | Jackson et al. ............. 254/423 |

* cited by examiner

Primary Examiner—Lee D. Wilson

(57) ABSTRACT

An automatic jacking system for automotive vehicles includes four sculpe jacks hingably mounted to the frame of the vehicle adjacent the vehicle wheels and hydraulic and electrical lines that communicate with the jacks for operating and controlling the jacks. The hydraulic lines couple the jacks to a fluid reservoir and pump of the hydraulic system, and the electrical lines extend from individual solenoids mounted on each jack to a control panel wherein an in-line fuse is disposed between the solenoids and the control panel switches for that jack and wheel. The control panel also includes a pressure switch for locking each jack in place, and each jack has an associated leak detection sensor that communicates with the control panel switch associated with that jack so that detection of a leak will cause the control panel switch for that jack to blink on and off thereby alerting the individual of a dangerous condition.

8 Claims, 4 Drawing Sheets

AUTOMATIC JACKING SYSTEM FOR AN AUTOMOTIVE VEHICLE

The present invention pertains to automatic jacking systems, and more particularly pertains to a motor vehicle jack system for selectively and independently raising the vehicle wheels for tire replacement and changing.

BACKGROUND OF THE INVENTION

Of the many mishaps that can occur to an automotive vehicle, sustaining a flat tire is one of the most exasperating and potentially dangerous as anyone knows that has ever attempted a roadside tire changing and repair. The laborious process of changing a damaged or flat tire includes jacking up the vehicle, unbolting the lug nuts that mount the tire to the wheel boss, removing the tire, replacing the damaged or flat tire with a good tire, remounting and correctly and firmly tightening the lug nuts, lowering the tire on the jack and then removing the jack for storage. However, as is well known, many motorists have little mechanical skills and are hesitant to attempt to undertake a potentially difficult mechanical action for which they have no preparation for and often in difficult conditions or dangerous locations. Moreover, even if the individual decides to change the tire, difficulties may be encountered in operating a jack that the individual is wholly unfamiliar with or in straining to remove lug nuts that have been overtorqued in mounting or have corroded to the point that they cannot be manually removed from the studs. Finally, it is usually the case that a flat tire occurs at the most inopportune time or the most dangerous condition, such as on a major highway during morning rush hour or during a driving thunderstorm or on a road without a berm thereby preventing the vehicle from being safely moved off the road.

In view of the above problems, automotive vehicles can be outfitted, either from the factory or as after market add-ons, with integrated or self-contained jacking systems. Such jacking systems can be pneumatically or hydraulically actuated to raise the entire vehicle or one portion of the vehicle.

For example, the Mueller et al. patent (U.S. Pat. No. 4,993,688) discloses a built-in power jack that includes pneumatic jacks attached to the front and rear suspensions and which can be coupled to the master brake cylinder for providing an anti-theft feature.

The Shelton patent (U.S. Pat. No. 5,219,429) discloses a hydra-lift system that includes multi-chambered hydraulic jacks mounted to the vehicle frame with the jacks coupled to a hydraulic manifold for vertically raising the vehicle.

The Torres et al. (U.S. Pat. No. 5,224,688) discloses a self-contained vehicle lift system that includes hydraulic jack units operated from a central controller for selective retraction and extension to lift the vehicle off the ground.

The Mosley patent (U.S. Pat. No. 5,377,957) discloses a vehicle mounted hydraulic jack system for lifting portions of a vehicle in which a hydraulic positioning assembly disposes each jack to the extended position and a solenoid controls the distribution of fluid to the jacks.

The Guzman et al. patent (U.S. Pat. No. 5,465,940) discloses a pneumatic jack system that includes pneumatic jacks mounted to the vehicle's suspension system with each jack including a key operated locking mechanism.

The Martin et al. patent (U.S. Pat. No. 5,722,641) discloses a vehicle mounted tire changing system that includes a plurality of hydraulic jacks mounted to the chassis and in flow communication with a hydraulic manifold for raising the vehicle.

The Dagnese patent (U.S. Pat. No. 5,931,500) discloses a hydraulic automobile jack system that includes a fluid pump for delivering pressurized fluid to hydraulic jacks upon receipt of a park signal on the hydraulic jack control panel.

The Mejias et al. patent (U.S. Pat. No. 6,224,040 B1) discloses a vehicle lift system for lifting a corner of a vehicle that includes a pair of rails and associated hydraulic jacks and a processor system for controlling the operation of the jacks.

The Farmer patent (U.S. Pat. No. 6,237,953 B1) discloses an automatic jack and wheel change system that includes a scissor jack that is raised by an electric motor and horizontal screw, and a novel wheel and hub-axle assembly.

Nonetheless, despite the ingenuity of the above devices, there remains a need for an automatic jacking system that can be mounted to the chassis or frame of a vehicle and which can safely and easily raise and lower the vehicle from a dashboard mounted control or from a remotely operable control.

SUMMARY OF THE INVENTION

The present invention comprehends an automatic hydraulic jacking system for raising and lowering an automotive vehicle so that tire changing and repair can be accomplished in a safe, efficient and relatively quick manner.

The automatic hydraulic jacking system includes four sculpe jacks with each jack hingably mounted to the underside of the vehicle frame or chassis adjacent each vehicle wheel. Hydraulic lines run from the jacks to a fluid reservoir and an electric pump so that fluid can be introduced into the cylinder of the jack, and withdrawn therefrom, and each jack includes a locking solenoid for locking the jack in place when the jack is disposed from the folded, non-use storage position to the deployed position. A control panel that can be dashboard mounted or remotely used, and which can be stored in the dashboard compartment, includes control switches with each control switch associated with each respective jack and electrical lines that interconnect the switches on the control panel to each locking solenoid. For safety purposes, an in-line fuse is interposed on the electrical circuitry between each control switch and the associated jack and locking solenoid. The control panel also includes a pressure switch for locking the jack and associated solenoid in place after the jack has been deployed for raising the wheel. In addition, a leak detection sensor is interconnected with each jack and the associated switch on the control panel for detecting any leaks in the hydraulic lines going to the cylinders of the jacks; if a leak is detected, the control switch for that jack is actuated and blinks on and off thereby alerting the vehicle operator that a failure condition has occurred in the automatic hydraulic jacking system.

It is an objective of the present invention to provide an automatic hydraulic jacking system for a motor vehicle that allows the motorist to change a vehicle tire in a dangerous area or during inclement weather in an easy and efficient manner.

It is another objective of the present invention to provide an automatic hydraulic jacking system for a motor vehicle that allows the individual to automatically raise the vehicle from a dashboard mounted control panel.

It is yet another objective of the present invention to provide an automatic jacking system for a motor vehicle that eliminates the need for cumbersome, difficult-to-use standard auto jacks.

It is still yet another objective of the present invention to provide an automatic jacking system for a motor vehicle that completely eliminates the messy process of manually jacking up a motor vehicle.

Still yet another objective of the present invention is to provide an automatic jacking system for a motor vehicle that allows an elderly or handicapped individual to jack up the motor vehicle.

Still yet a further objective of the present invention is to provide an automatic jacking system for a motor vehicle that allows the individual to quickly and safely raise and lower the motor vehicle thereby facilitating the efficient process of changing a vehicle tire.

These and other objects, features and advantages will become apparent to those skilled in the art upon a perusal of the following detailed description read in conjunction with accompanying drawing figures and appended claims.

DETAILED DESCRIPTION OF THE PREFERRED EMBODIMENT

Figure 1:
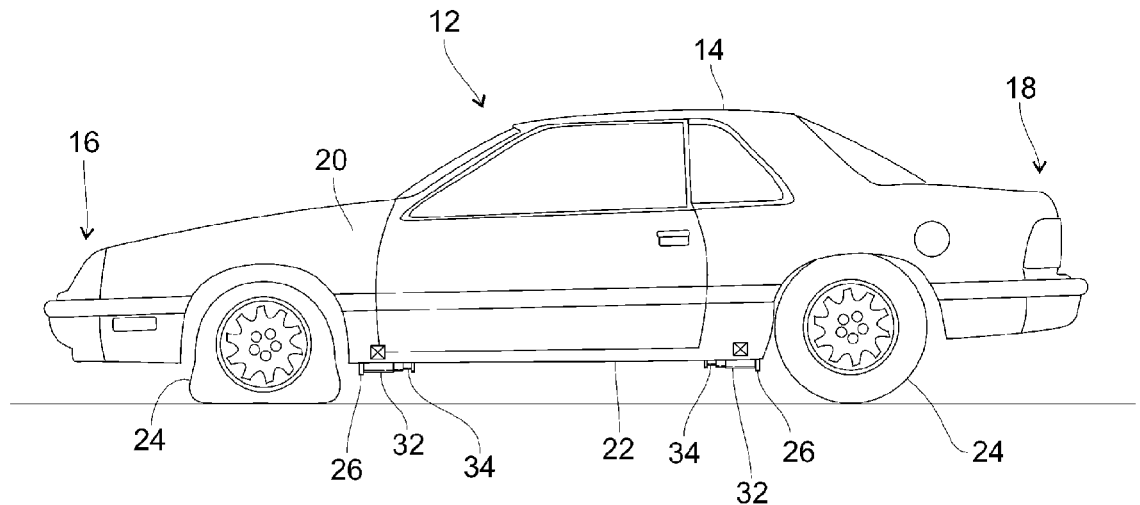
FIG. 1 is a side elevational view of the automatic jacking system of the present invention illustrating the mounting of two hydraulic jacks to the frame underside of the vehicle with the jacks in the retracted position.
Figure 2:
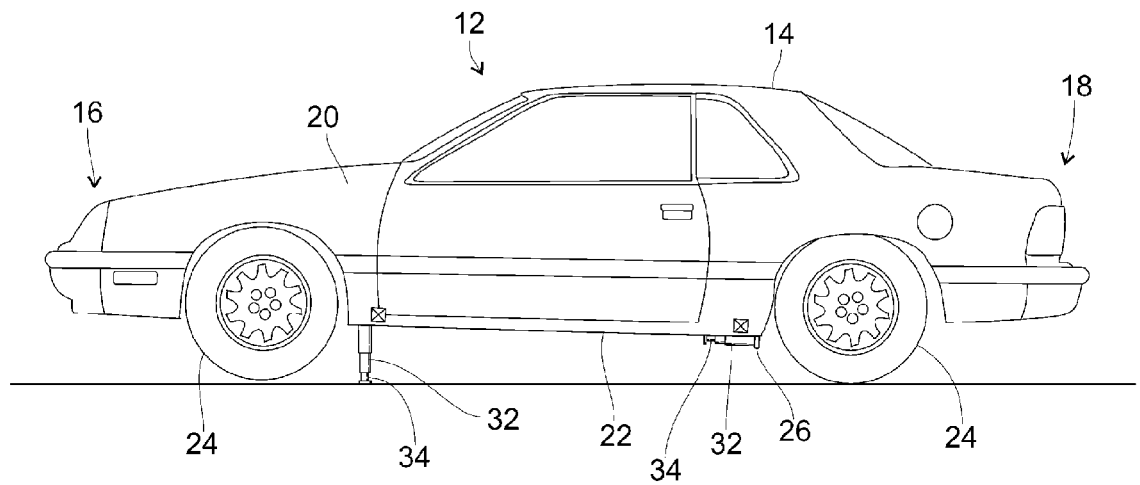
FIG. 2 is a side elevational view of the automatic jacking system of the present invention illustrating one of the hydraulic jacks first shown in FIG. 1 in the retracted disposition and one hydraulic jack in the extended disposition for raising the front portion of the car.

Illustrated in FIGS. 1–6 is an automatic jacking system 10 for an automotive vehicle 12 such as the automobile 14 of FIGS. 1 and 2. The automobile 14 includes a front end 16 and an opposite rear end 18, an automobile body 20 having an underside frame or chassis 22 and four wheels 24—specifically, left and right front tires and left and right rear tires. The automatic jacking system 10 can be incorporated with the electrical system of the automobile 14 for providing the electrical power for the system 10, and the automatic jacking system 10 allows the individual/vehicle operator to safely and quickly raise the automobile 14 to repair or change the tire, and then safely lower the automobile 14 after tire repair and changing has been completed. It is generally intended that the automatic jacking system 10 of the present invention be sold as an after market product. FIG. 1 shows the automatic jacking system 10 folded into the storage or non-disposed state and FIG. 2 shows the automatic jacking system 10 in the disposed state for raising the automotive vehicle 12.

Figure 3:
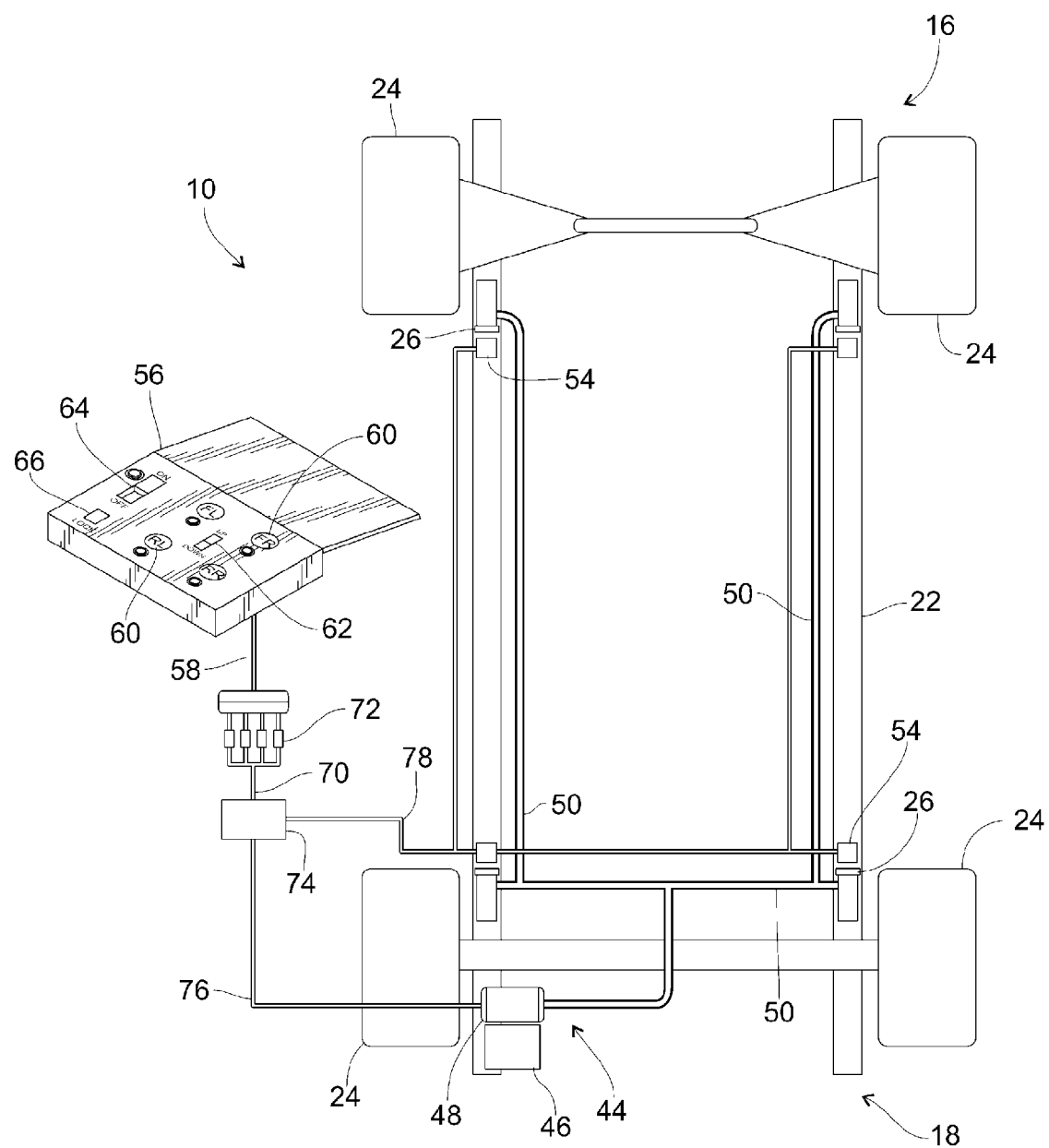
FIG. 3 is a top plan schematic view of the automatic jacking system of the present invention illustrating the fluid lines and the electrical lines that carry fluid to the hydraulic jacks and electrical power to the jacks for extending and retracting the jacks as needed.
Figure 4:
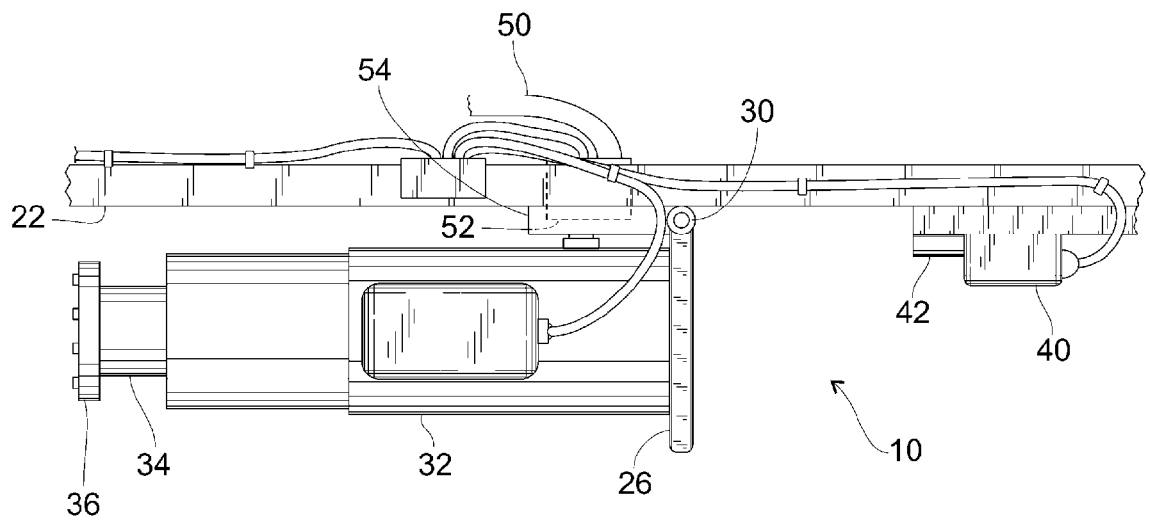
FIG. 4 is a side elevational view of the automatic jacking system of the present invention illustrating the disposition of the hydraulic jack when in the retracted and folded position beneath the frame of the vehicle.
Figure 5:
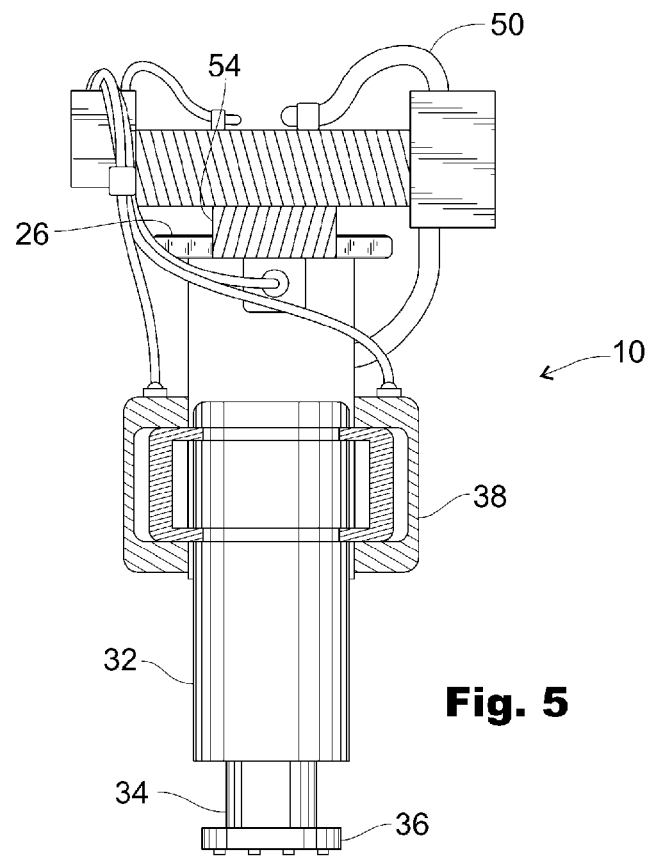
FIG. 5 is a side elevational view of the automatic jacking system of the present invention illustrating the disposition of the hydraulic jack in the extended position for raising the adjacent wheel.

As shown in FIGS. 1–5, the automatic jacking system 10 includes four jacks 26, with the jacks 26 preferably being sculp jacks of the kind that are commonly used on custom built, designed and modified vehicles referred to as "low riders." Each jack 26 is hingably mounted to the frame underside 22 by a mounting block 28 that includes an electric hinge 30 so that each jack 26 can be selectively pivotally disposed from a folded and retracted non-use position to an extended use position for raising and lowering the automotive vehicle 12, and the jacks 26 are mounted adjacent the vehicle tires 24. Each jack 26 includes a main cylinder 32 with a slidable piston 34 disposed therein, and it is the selective retraction and extension of the piston 34 that lowers and raises that portion of the vehicle 12 adjacent the particular jack 26. The piston 34 includes a foot or plate 36 for supporting the jack 26 on soft ground. Mounted to each jack 26 is a locking solenoid 38 (a solenoid valve) that controls the selective movement of the jack 26 between the folded position and the use position and facilitates the locking in place of the jack 26 after piston 34 extension. In addition, as shown in FIG. 4, a secondary solenoid 40 is mounted to the chassis underside 22 adjacent each jack 26 and includes a retractable and extendible slide 42 that facilitates and stabilizes the movement of the jack 26 from the folded position to the use position. The automatic jacking system 10 includes a hydraulic system 44 for mechanically raising and lowering the jacks 26 by supplying the jacks 26 with hydraulic fluid under pressure, and specifically to the main cylinders 32, after the jacks 26 have been deployed to the use position as shown in FIGS. 2 and 5. The hydraulic system 10 includes a hydraulic fluid reservoir 46 in fluid communication to an electric pump 48. Hydraulic fluid lines 50 extend from the pump 48 and reservoir 46 along the chassis underside 22 and communicate with each jack 26 for supplying hydraulic fluid to each jack 26 in order to selectively actuate piston 34 extension and retraction for raising and lowering the automotive vehicle 12. As an additional safety feature and measure, each jack 26 will have an associated leak detection sensor 52 mounted to a hydraulic block 54 adjacent the respective jack 26. The leak detection sensors 52 alert the operator to a leak or failure in the hydraulic system 44 as will be hereinafter described.

A portable control means is electrically interconnected to the locking solenoids 38, the secondary solenoids 40, and the hydraulic system 44 for operating and controlling the disposition of the jacks 26 from the folded retracted position to the use position, and for controlling the extension of the jacks 26, specifically the pistons 34, in order to raise and lower the automotive vehicle 12. The portable control means includes a control panel 56 that can be stored in the dashboard compartment when the system 10 is not in use, and includes an electrical cord 58 of at least 15 feet to allow the operator to move about the automotive vehicle 12 while holding the control panel 56 so that the operator can directly view the operation of the automatic jacking system 10 and monitor the raising and lowering of the vehicle 12. The control panel 56 includes manually operable control buttons or switches 60 that initiate the disposition (movement) of the jacks 26 to the use position. Each control switch 60 is coupled to and electrically interconnected with one specific jack 26. More specifically, the control switches 60 include one front left tire control switch (the FL switch), one front right tire control switch (the FR switch), one rear left tire control switch (the RL switch), and one rear right tire control switch (the RR switch). The control panel 56 also includes an up/down button or rocker switch 62 electrically interconnected to the jacks 26 and the electric pump 48 for operating and controlling the raising and lowering of the jack 26 that has been selected by that respective control switch 60. The control panel 56 also includes a main control switch 64—the on/off switch—for initially engaging the automatic jacking system 10 and for switching off the system 10 during normal vehicle operation. A safety control device in the form of a locking pressure switch 66 is included on the control panel 56, and is electrically interconnected to the locking solenoids 38 for locking the jacks 26 in position after the vehicle 12 has been raised to the desired height through the extension of the selected piston 34.

Figure 6:
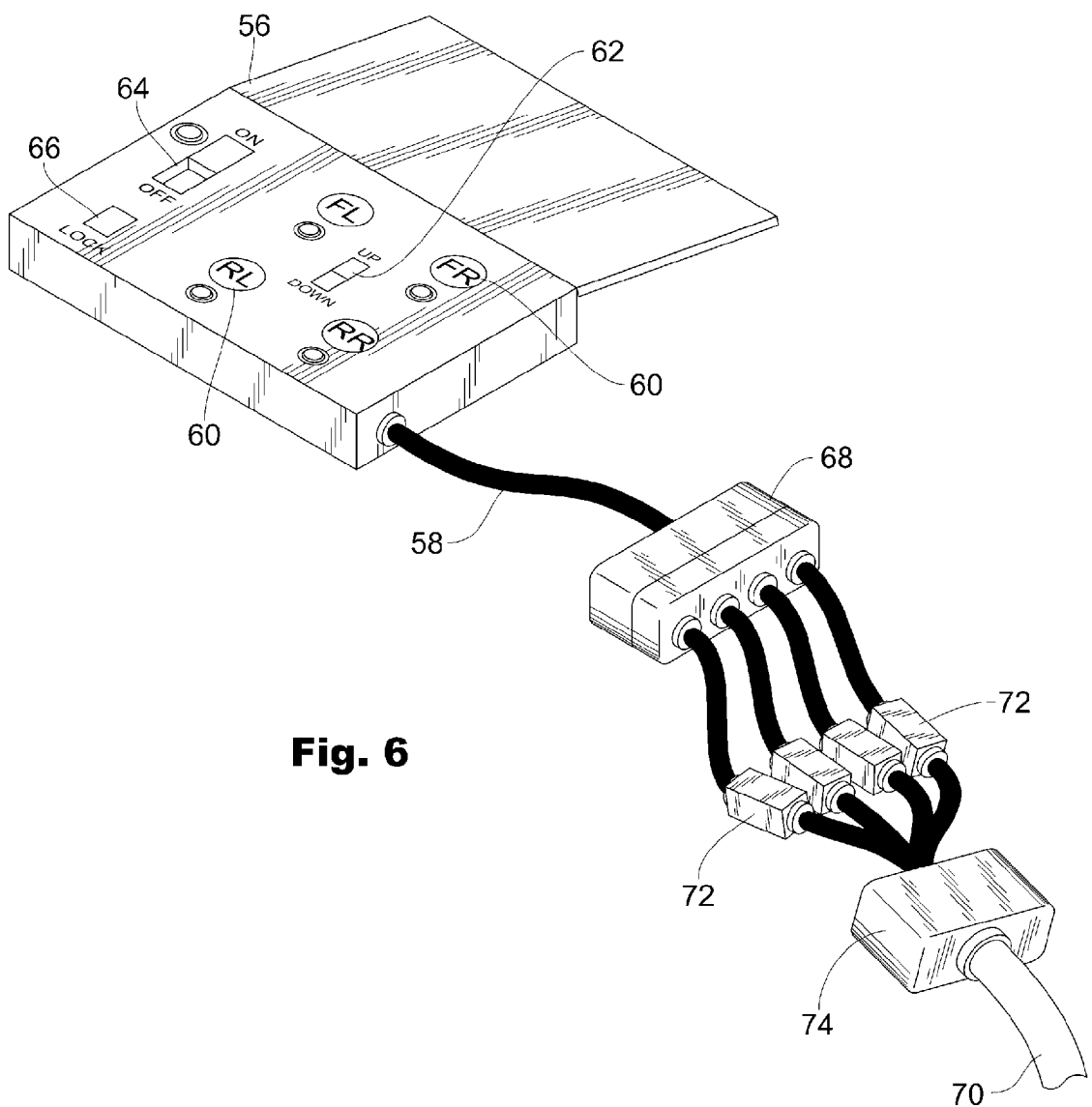
FIG. 6 is a perspective view of the control panel and electrical lines for the solenoids and the hydraulic system that controls the extension and retraction of the hydraulic jacks.

As shown in FIGS. 3 and 6, the control panel 56 is connected to a plug 68 by a connector line 70. Four in-line fuses 72 are electrically interposed between the respective solenoids 38 and the hydraulic system 44 and the control switches 60 of the control panel 56, and the control panel 56 is connected to the plug 68 for using the automatic jacking system 10 and unplugged therefrom for storing the control panel 56 when the automatic jacking system 10 is not being used. The in-line fuses 72 are electrically interconnected to a connector block 74, and a primary electrical line 76 extends from the connector block 74 to the electric pump 48 thereby electrically connecting the control panel 56 to the pump 48. A secondary electrical line 78 extending from the connector block 74 electrically interconnects the leak detection sensors 52 to the connector block 74 and thus to the control panel 56. Should a leak be detected in the hydraulic system 44 the leak detection sensor 52 that senses the failure condition will transmit a signal to the control panel 56, and the control switch 60 associated with that particular jack 26 will flash on and off thereby providing a visual signal to the operator that a failure in the system 44 has been detected. For the safe operation of the automatic jacking system 10, it is recommended that only one wheel 24 at a time be raised for a tire repair and changing operation.

While certain novel features of this invention have been shown and described, it will be understood that numerous modifications, variations, and alterations are both possible and practicable by those skilled in the art without departing from the spirit of the invention and the scope of the appended claims.

What is claimed is:

1. An automatic jacking system for mounting to a frame underside of an automotive vehicle adjacent the wheels of the automotive vehicle, comprising:
   a plurality of jacks with each jack hingably mounted to the frame underside adjacent each wheel of the automotive vehicle and movable between a folded storage position and a use position for selectively raising that portion of the automotive vehicle adjacent each respective wheel;
   each jack including: a main cylinder having a slidable piston disposed therein;
   a locking solenoid mounted to each jack for locking the jack in place after the jack has been disposed to the use position for raising the automotive vehicle adjacent that respective wheel;
   a plurality of secondary solenoids with each secondary solenoid mounted to the frame underside adjacent each jack to assist in controlling the extension of each jack to the use position and the retraction of each jack to the folded, storage position;
   a hydraulic system for supplying hydraulic fluid to the main cylinders of the jacks after each respective jack has been disposed to the use position so that the jacks can actuate the raising and lowering of the automotive vehicle;
   the hydraulic system including a fluid reservoir in communication with an electric pump and hydraulic lines extending from the pump and reservoir to each jack;
   a plurality of leak detection sensors with each leak detection sensor coupled to each jack for detecting the occurrence of a hydraulic fluid leak associated with that respective jack and in the hydraulic system;
   a control panel electrically interconnected to the jacks, the locking solenoids, the secondary solenoids, the electric pump and the leak detection sensors and having an electrical cord of a length to allow an individual to move about the automotive vehicle to monitor the operation of the jacks during the raising and lowering of the automotive vehicle; and
   the control panel including four control switches with each control switch coupled to each jack for controlling the disposition of the jacks from the folded position to the use position, an up/down switch for initiating the extension and retraction of the piston for raising and lowering the automotive vehicle, and a locking switch for actuation of the locking solenoid to lock the jack in place after the extension of the piston to raise the automotive vehicle.

2. The automatic jacking system for an automotive vehicle of claim 1 wherein the control panel includes a main control switch for initially engaging the automatic jacking system and for switching the automatic jacking system off when not in use.

3. The automatic jacking system for an automotive vehicle of claim 2 further comprising four in-line fuses interposed between the control panel and the electric pump with each in-line fuse associated with each respective control switch.

4. The automatic jacking system for an automotive vehicle of claim 1 wherein the control switches visually flash when the leak detection sensors detect a leak in the hydraulic system.

5. An automatic jacking system for mounting to a frame underside of an automotive vehicle adjacent the wheels of the automotive vehicle, comprising:
   a plurality of jacks with each jack hingably mounted to the frame underside adjacent each wheel of the automotive vehicle with each jack selectively movable from a folded position to a use position so that portion of the automotive vehicle adjacent that respective wheel can be raised and lowered;
   each jack including: a main cylinder having a slidable piston disposed therein;
   a locking solenoid mounted to each jack for locking each jack in place after the jack has been disposed to the use position and that portion of the automotive vehicle adjacent that respective wheel has been raised;
   a plurality of secondary solenoids with each secondary solenoid mounted to the frame underside adjacent each jack to assist in controlling the extension of each jack to the use position and the retraction of each jack to the folded position for storage;
   a hydraulic system for supplying hydraulic fluid to the main cylinders of the jacks so that the jacks can raise and lower the automotive vehicle after the jacks have been disposed to the use position;

the hydraulic system including a fluid reservoir in fluid communication with an electric pump and having hydraulic lines extending from the reservoir and pump for fluid communication with the jacks;

a plurality of leak detection sensors with each leak detection sensor interconnected to each jack for detecting the occurrence of a hydraulic fluid leak in the hydraulic system;

a control panel electrically interconnected to the jacks, the locking solenoids, the secondary solenoids, the electric pump and the leak detections sensors and having an electrical cord that allows the individual to move about the automotive vehicle for monitoring the operation of the jacks during the process of raising and lowering the automotive vehicle; and the control panel including four control switches with each control switch coupled to each jack for controlling the disposition of that jack from the folded position to the use position, an up/down switch for actuating the extension and retraction of the piston to thereby raise and lower the automotive vehicle, and a locking switch for actuation of the locking solenoid to lock the jack in place for maintaining the automotive vehicle in raised position.

6. The automatic jacking system for an automotive vehicle of claim 5 wherein the control panel includes a main control switch for initially engaging the automatic jacking system and for switching the automatic jacking system off when not in use.

7. The automatic jacking system for an automotive vehicle of claim 6 further comprising four in-line fuses electrically interposed between the control panel and the electric pump with each in-line fuse associated with each respective control switch.

8. The automatic jacking system for an automotive vehicle of claim 7 wherein the control switches visually flash when the leak detection sensors detect a leak in the hydraulic system or the jacks.

* * * * *